United States Patent
Delmas et al.

(10) Patent No.: US 11,498,833 B2
(45) Date of Patent: Nov. 15, 2022

(54) DEVICE FOR GENERATION OF A GAS

(71) Applicant: COMMISSARIAT A L'ENERGIE ATOMIQUE ET AUX ENERGIES ALTERNATIVES, Paris (FR)

(72) Inventors: Jerome Delmas, Grenoble (FR);
Olivier Blanchot, Grenoble (FR);
Philippe Capron, Grenoble (FR);
Vincent Faucheux, Grenoble (FR);
Isabelle Rougeaux, Grenoble (FR);
Olivier Tosoni, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 289 days.

(21) Appl. No.: 16/842,878

(22) Filed: Apr. 8, 2020

(65) Prior Publication Data
US 2020/0325017 A1    Oct. 15, 2020

(30) Foreign Application Priority Data

Apr. 9, 2019  (FR) ...................................... 19 03787

(51) Int. Cl.
*C01B 3/06*  (2006.01)
*B01J 16/00*  (2006.01)
(Continued)

(52) U.S. Cl.
CPC ............ *C01B 3/065* (2013.01); *B01J 16/005* (2013.01); *B01J 19/087* (2013.01); *B01J 19/18* (2013.01);
(Continued)

(58) Field of Classification Search
CPC . C01B 3/065; C01B 3/0015; C01B 2203/066; B01J 16/005; B01J 19/087;
(Continued)

(56) References Cited

U.S. PATENT DOCUMENTS

2006/0185242 A1*  8/2006  Cha ...................... H01M 8/065
                                                   48/77
2017/0104426 A1*  4/2017  Mills ........................ C25B 1/04

FOREIGN PATENT DOCUMENTS

CN      102203998 A    9/2011
CN      206860248 U    1/2018
(Continued)

OTHER PUBLICATIONS

French Preliminary Search Report dated Nov. 19, 2019 in French Application 19 03787 filed on Apr. 9, 2019 (with English Translation of Categories of Cited Documents), citing documents AA & AO-AP therein, 3 pages.

(Continued)

*Primary Examiner* — Steven J Bos
*Assistant Examiner* — Syed T Iqbal
(74) *Attorney, Agent, or Firm* — Oblon, McClelland, Maier & Neustadt, L.L.P.

(57) ABSTRACT

A device includes a catalytic system and an electromagnetic system. The catalytic system defines a catalysis chamber and includes a catalyst of a reaction to generate a gas from a liquid. The catalyst is housed in the catalysis chamber. The electromagnetic system includes a coil and a rod mobile relative to the coil, the rod being fixed to the catalytic system and including a magnet and a core. The electromagnetic system is configured to move the rod relative to the coil when an electrical current is passed through the coil, so as to dispose the catalytic system in an open position in which the catalysis chamber is in fluidic communication with the outside. The catalytic system is disposed in a closed position in which the catalysis chamber is hermetically closed in the absence of an electrical current through the coil.

20 Claims, 7 Drawing Sheets

(51) Int. Cl.
   *B01J 19/08* (2006.01)
   *B01J 19/18* (2006.01)
   *C01B 3/00* (2006.01)

(52) U.S. Cl.
   CPC ..... *C01B 3/0015* (2013.01); *B01J 2219/0856* (2013.01); *B01J 2219/0858* (2013.01); *B01J 2219/0869* (2013.01)

(58) Field of Classification Search
   CPC ............... B01J 19/18; B01J 2219/0856; B01J 2219/0858; B01J 2219/0869; B01J 8/0278; B01J 7/02; B01J 8/001; B01J 8/008; B01J 2208/06; Y02E 60/32; Y02E 60/36; Y02E 60/50; H01M 8/065; E05F 15/60; E05Y 2201/434; E05Y 2900/60
   See application file for complete search history.

(56) References Cited

FOREIGN PATENT DOCUMENTS

| | | |
|---|---|---|
| EP | 1 496 014 A1 | 1/2005 |
| JP | 52-96421 | 7/1977 |
| JP | 2009-161378 A | 7/2009 |
| JP | 2009161378 A * | 7/2009 |
| KR | 10-2007-0005446 A | 1/2007 |
| KR | 10-2013-0062506 A | 6/2013 |

OTHER PUBLICATIONS

Notice of Reasons for Rejection dated Jul. 5, 2021 in Japanese Patent Application No. 2020-069784 (with English machine translation), citing document AO therein, 7 pages.

Notice of Grounds for Rejection dated Aug. 18, 2021 in Korean Patent Application No. 10-2020-0042692 (with English machine translation), citing documents AP and AQ therein, 15 pages.

Combined Chinese Office Action and Search Report dated Oct. 28, 2021 in Patent Application No. 202010275967.6 (with English machine translation), citing documents AR and AS therein, 18 pages.

* cited by examiner

[Fig 1]
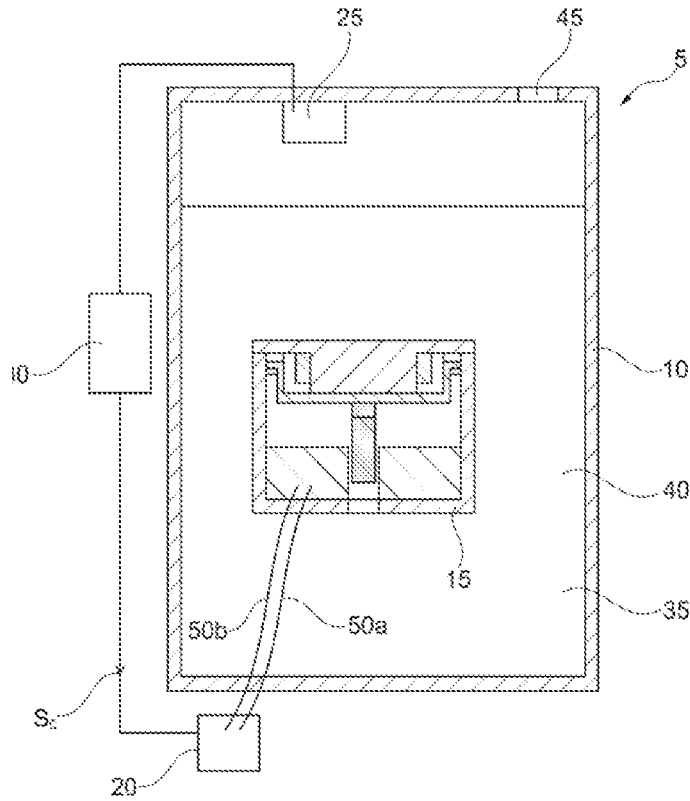
[Fig 2]
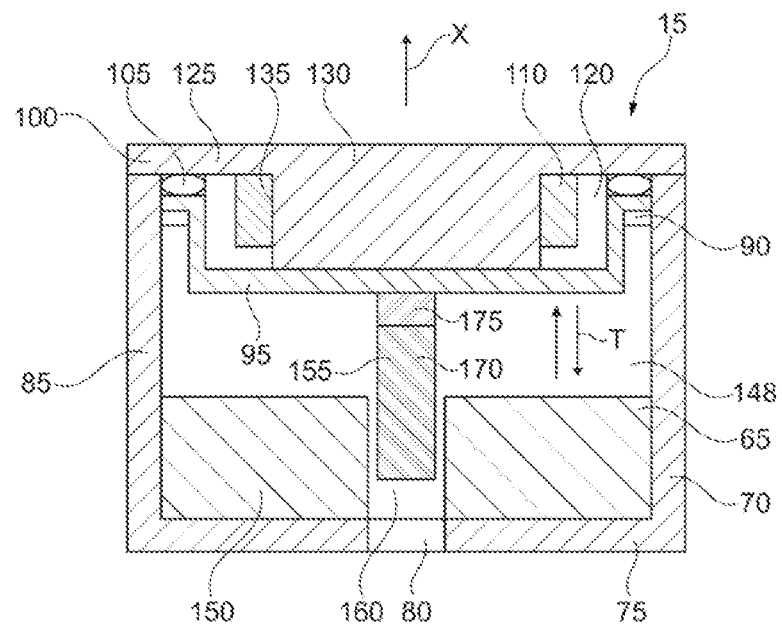

[Fig 3]
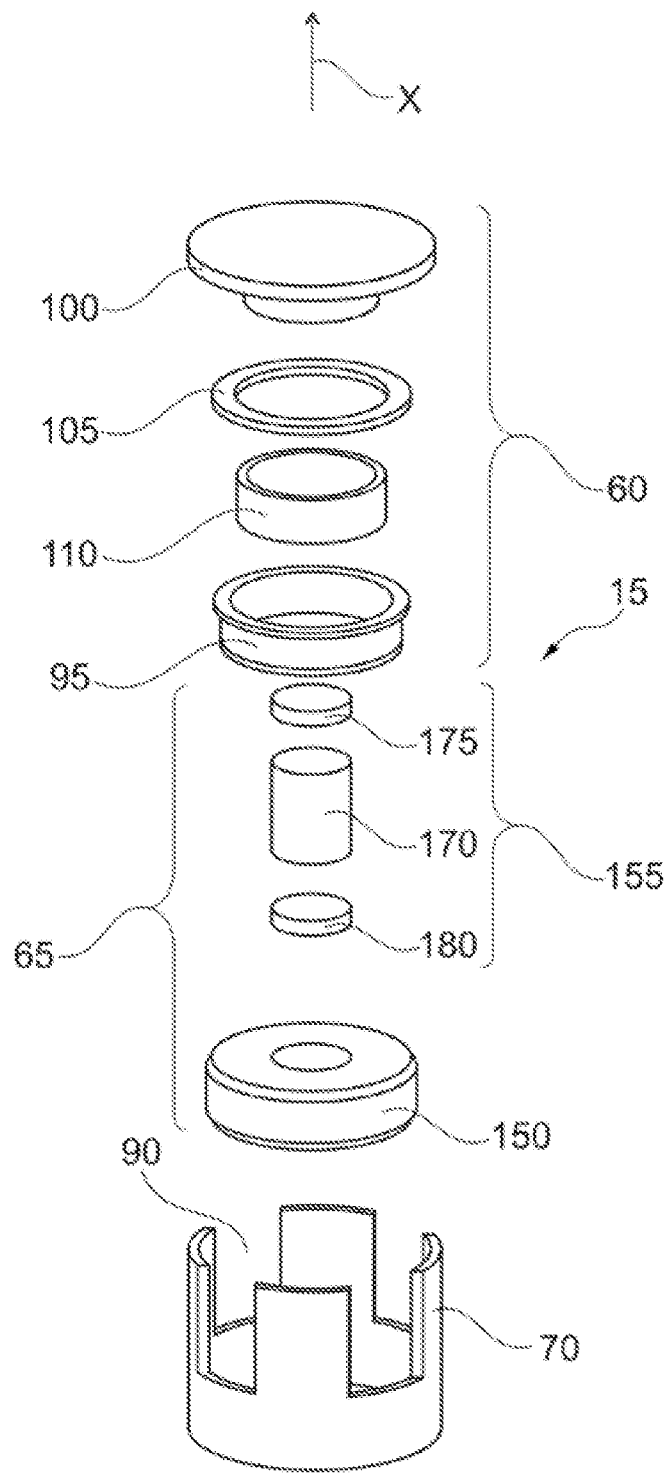

[Fig 4]
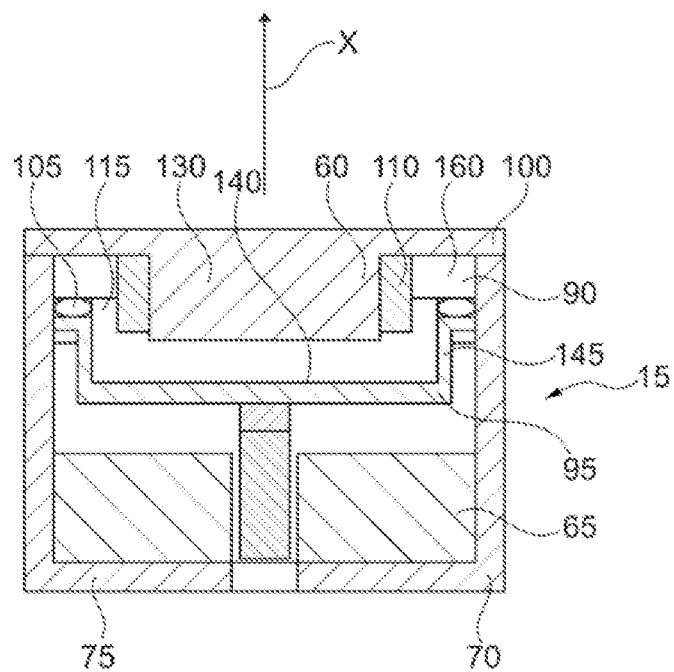
[Fig 5]
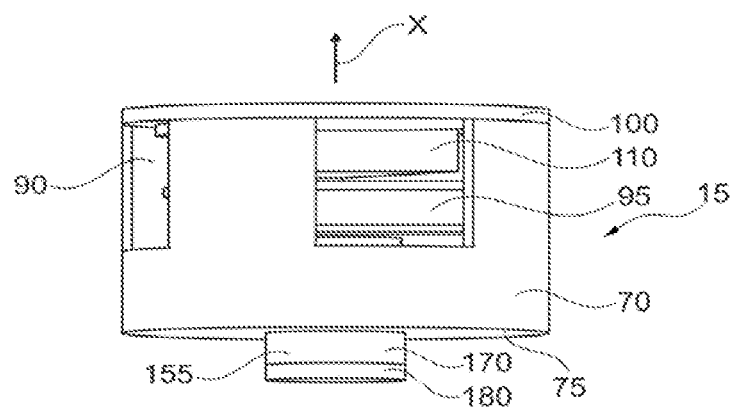

[Fig 6]
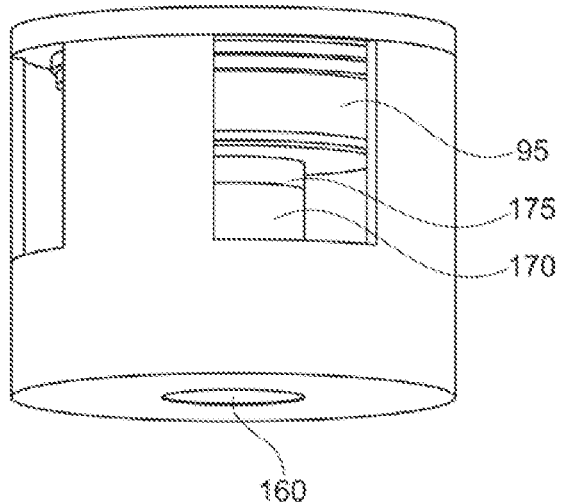
[Fig 7]
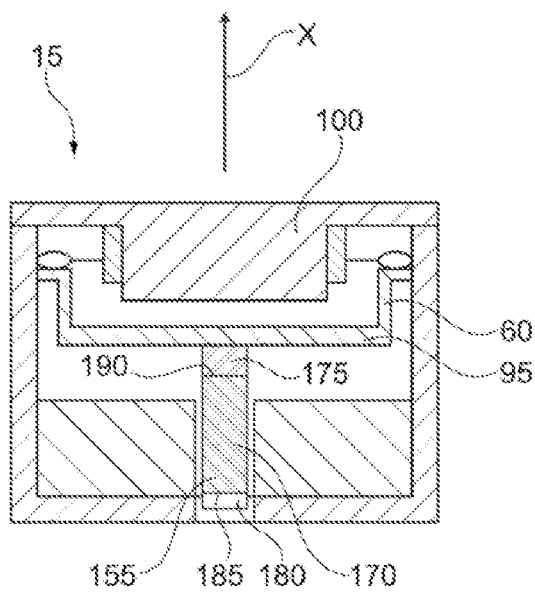

[Fig 8]
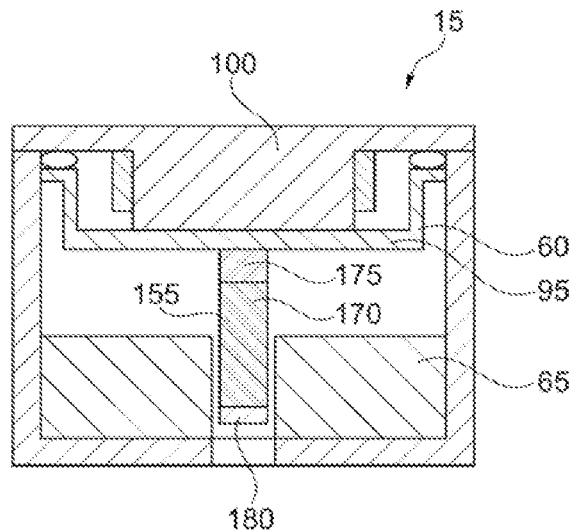
[Fig 9]
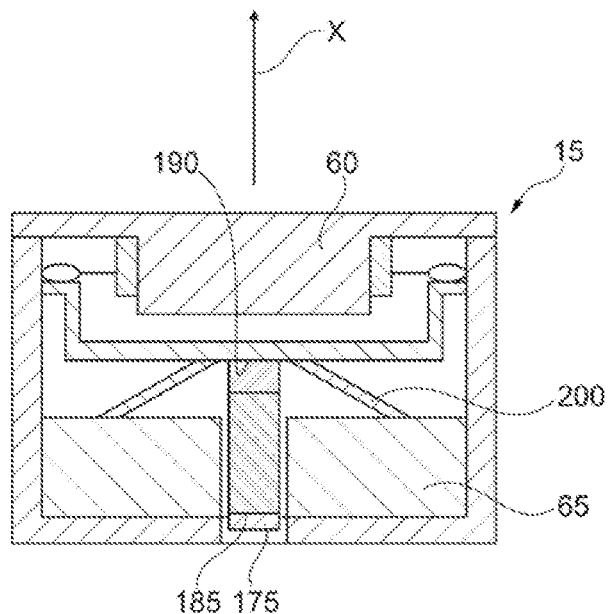

[Fig 10]
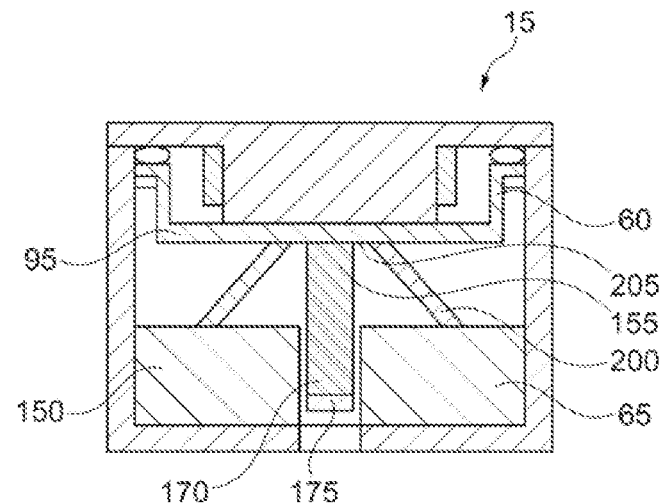
[Fig 11]
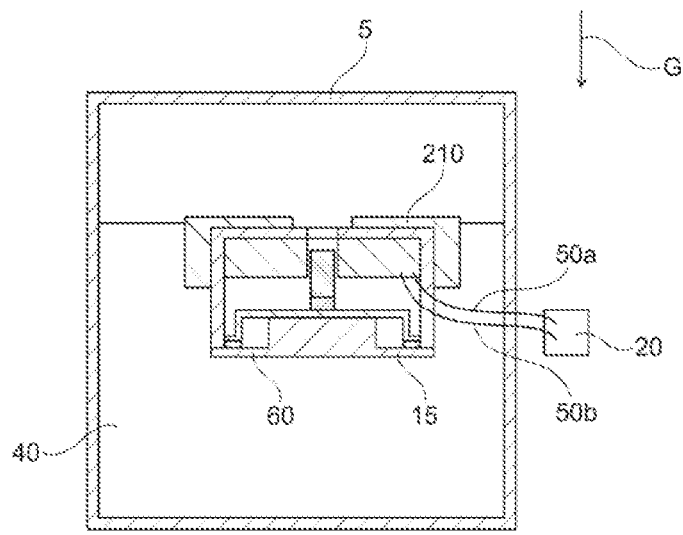

[Fig 12]
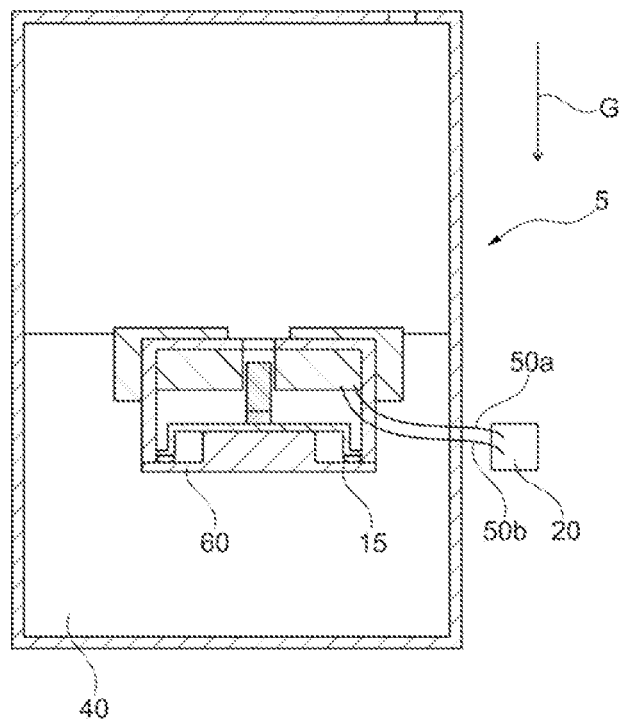
[Fig 13]
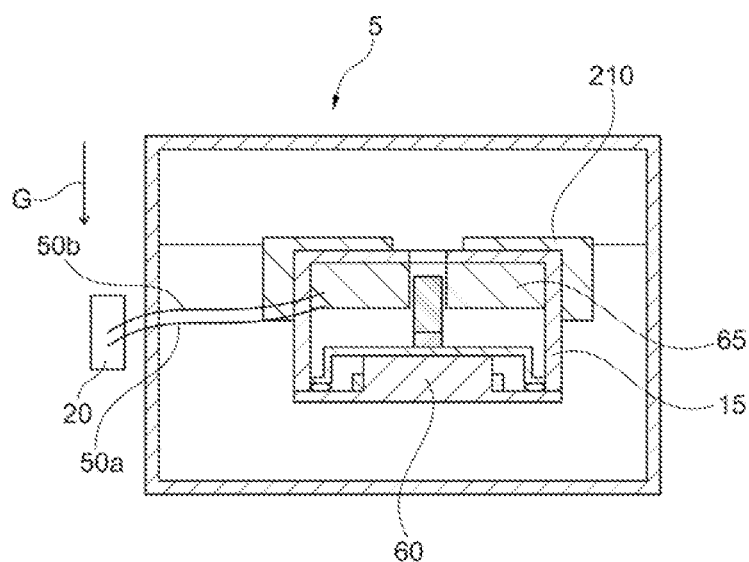

DEVICE FOR GENERATION OF A GAS

TECHNICAL FIELD

The present invention concerns a device for generating a gas by catalytic reaction of a liquid and a method of generating the gas.

PRIOR ART

A well-known method for generating dihydrogen consists in bringing an aqueous hydride solution, for example a sodium borohydride solution, into contact with a catalyst of the reaction of hydrolysis of the hydride, formed for example of cobalt, of platinum or of ruthenium. In contact with the catalyst, a reaction of hydrolysis of the aqueous solution occurs, generating dihydrogen.

By way of illustration, WO 2012/003112 A1 and WO 2010/051557 A1 describe generators for executing this kind of catalytic hydride hydrolysis. The gas generators described in those documents include an enclosure containing, in operation, an aqueous hydride solution, and a catalytic system defining a catalysis chamber containing a catalyst of the hydrolysis of the aqueous hydride solution.

The catalytic system includes a body and a removable cover. In the closed position of the catalytic system, the cover and the body together isolate the catalyst from the aqueous hydride solution. There is then no generation of hydrogen. In the open position of the catalytic system, the cover is disposed at a distance from the body. The aqueous hydride solution then comes into contact with the catalyst, thus initiating the generation of dihydrogen. The dihydrogen generated in this way is evacuated from the enclosure via an evacuation opening.

To prevent the pressure of dihydrogen generated in the enclosure from being too high, the catalytic system described in WO 2012/003112 A1 and WO 2010/051557 A1 includes an elastomer membrane taking the form of a hollow cylindrical tube fixed both to the body and to the cover. The body further includes a drain discharging outside the enclosure at one of its ends and in the interior space of the membrane at its opposite end, so that the pressure in the interior space of the membrane is equal to atmospheric pressure. Accordingly, if the pressure of dihydrogen in the enclosure is greater than a threshold pressure the cover is pushed against the body by the effect of the pressure in the enclosure, contracting the elastomer membrane through a torsion effect, as far as the closed position of the catalytic system. If the pressure in the enclosure is less than the threshold pressure the elastomer membrane, seeking to return to its equilibrium position, is deployed and clears the cover in the open position of the catalytic system, so as to enable access of the aqueous hydride solution to the catalyst.

The exposure of the catalyst to the aqueous hydride solution is controlled in a passive manner in WO 2012/003112 A1 and WO 2010/051557 A1, i.e. the catalytic system is opened and closed only as a function of the pressure of dihydrogen in the enclosure. The catalyst system described in the above two documents is therefore not very flexible to use. The catalytic systems from WO 2012/003112 A1 and WO 2010/051557 A1 have other disadvantages.

In order to ensure optimum deployment and contraction of the elastomer membrane, it is necessary for the height of the membrane to be small, which limits access of the hydride-based aqueous solution to the catalyst.

The catalyst system closing threshold pressure is determined by the stiffness of the elastomer membrane, which depends on the shape and the mechanical, in particular elastic, properties of the elastomer membrane. Sizing the membrane to ensure optimum operation of the gas generator is therefore complicated.

Moreover, it is not possible to control opening and closing of the catalytic system independently of the pressure in the enclosure. The catalytic system is open by default and it is necessary for the gas pressure to exceed the threshold pressure for the system to be closed. In the case of leaks, the generation of hydrogen is then not under control.

Finally, the prior art catalytic system is relatively bulky, which prejudices pneumatic applications (portable computer or mobile telephone, drone, etc.) for which it may be intended.

In particular, the dimensions and the shape of the catalytic system from WO 2012/003112 A1 and WO 2010/051557 A1 must be modified as soon as the dimensions and the shape of the catalyst are modified. It is therefore of complex design.

There is therefore a need for a gas generator usable to generate a gas by bringing a liquid into contact with the catalyst that eliminates the aforementioned disadvantages.

SUMMARY OF THE INVENTION

The invention addresses this requirement and proposes a device including a catalytic system and an electromagnetic system, the catalytic system defining a catalysis chamber and including a catalyst of a reaction to generate a gas from a liquid, the catalyst being housed in the catalysis chamber, the electromagnetic system including a coil and a rod mobile relative to the coil, the rod being fixed to the catalytic system and including a magnet and a core, the electromagnetic system being configured to move the rod relative to the coil when an electrical current is passed through the coil, so as to dispose the catalytic system in an open position in which the catalysis chamber is in fluidic communication with the outside, the catalytic system being disposed in a closed position in which the catalysis chamber is hermetically closed in the absence of electrical current through the coil.

By placing the device in contact with the liquid, the generation of gas can be triggered simply by supplying the bobbin with an electrical current, to dispose the catalysis chamber in the open position. If the coil is supplied with electrical power and carries an electrical current, it generates an electromagnetic field that attracts the magnet toward it. The catalytic system, fixed to the rod, is consequently moved from the closed position to the open position. The liquid is then able to penetrate into the catalysis chamber and enter into contact with the catalyst. The gas can therefore be generated.

The generation of gas can thereafter be stopped just as simply by cutting off the electrical power supply of the coil.

It is therefore possible, in particular in compliance with pre-established criteria, to stop the generation of hydrogen in the event of defective operation of a generator including the device or of a fuel cell supplied by this kind of generator.

The gas can therefore be generated independently of the pressure of the gas and/or of the temperature of the gas in the enclosure. Relative to the device described in WO 2012/003112 A1 and WO 2010/051557 A1, the generation of gas can be triggered and stopped under the control of the user of the device, independently of the value of the pressure of the gas in the enclosure.

Moreover, the device according to the invention is of limited overall size.

In the closed position, the catalysis chamber is "hermetically sealed". It is liquid-tight and gas-tight. For example, if the device is immersed in a liquid in the closed position the liquid is not able to penetrate into the catalysis chamber. This reduces the risk of unwanted generation of gas.

By "open position" any position in which the catalysis chamber is in fluidic communication with the outside is meant. By "the outside" what is outside the catalysis chamber is meant. In particular, the open position may be an extreme open position at which the travel of the actuator is reached.

At least a part of the catalytic system may be subjected to an electromagnetic closing force induced by the magnet that holds the catalytic system in the closed position in the absence of electrical current through the coil. Over and above its participation in opening the catalytic system as described above, the magnet advantageously participates in closing the catalytic system.

At least a portion of the catalytic system is preferably made of a ferromagnetic material. The ferromagnetic material is for example iron or an alloy of at least one metal chosen from iron, cobalt and nickel, in particular steel.

The catalytic system preferably includes a first part and a second part fixed rigidly to the rod. The first and second parts together define the catalysis chamber and are mobile relative to one another between the open and closed positions. The first part preferably hermetically closes the second part in the closed position, or vice versa. The catalytic system preferably includes a seal compressed between the first and second parts in the closed position to improve the seal of the catalysis chamber.

The seal may be mounted on the first part or on the second part.

The first and second parts may be mobile relative to one another between the open and closed positions in translation and/or in rotation, in particular only in translation.

In the open position the first and second parts define at least one opening connecting the catalysis chamber to the outside.

The part of the catalytic system subjected to the electromagnetic closing force induced by the magnet preferably includes at least the first part and/or the catalyst.

In particular, the first part may include, preferably consist of, a ferromagnetic material, in particular steel or soft iron.

The shortest distance between the first part and the magnet may be less than 10 mm, or even less than 5 mm. This ensures that the first part and the magnet are attracted because of the effect of the magnetization of the magnet.

The second part may be disposed between the first part and the rod, in particular the magnet.

The second part is preferably compressed between the first part and the magnet in the closed position.

The second part may be in contact with the first part and the magnet in the closed position. The second part is preferably made of a plastic material, for example a thermosetting material. Thus it does not interact with the electromagnetic interaction between the magnet and the first part.

The catalyst may be a ferromagnetic material. It may be magnetically attracted by the magnet.

The catalyst is preferably a metal, preferably adapted to catalyze the hydrolysis of a hydride-based solution or a liquid organic hydrogen carrier. A particularly preferred catalyst is chosen from cobalt, nickel, platinum, ruthenium and their alloys. In particular, the catalyst may be made of steel.

The catalyst may be fixed to the first part and/or to the second part.

In one particular embodiment the first part may be made of an amagnetic material or a paramagnetic material and the catalyst include, or even consist of, a ferromagnetic material. The catalyst is then preferably fixed to the first part.

The coil may have an annular and in particular toric general shape.

The coil may be formed of at least one metal, for example copper, wire coated with an electrical insulator, for example a resin, and wound into multiple windings around a winding support that may guide the rod.

The coil may be fixed relative to the first part.

The coil may include an opening in which the rod, and in particular the core, is housed and is mobile in translation, for example in a longitudinal direction.

At least in the closed position, the magnet is preferably situated at a distance from the coil in the longitudinal direction. It is preferably housed outside the opening.

The coil and the rod, and in particular the core, are preferably arranged so that the coil guides the movement of the rod between the open and closed positions of the catalytic system.

The rod is preferably at a distance from the winding support in the open and closed positions. It therefore does not rub on the coil, which facilitates opening and closing the catalytic system. The distance separating the core and the coil, measured in a direction normal to the direction of movement of the core relative to the coil, may be between 0.1 mm and 2.0 mm inclusive.

The rod may preferably be entirely coated with a plastic material. Corrosion of the rod by a hydride solution can thus be limited.

The device preferably includes a casing, the first part being rigidly fixed to the casing, the first part and the casing forming a cage in which the coil is trapped. The coil may in particular be fixed to the casing.

The casing may be made of steel or soft iron.

The second part is preferably housed in the casing.

The casing may guide the movement of the second part between the open position and the closed position.

As described hereinabove, the rod is fixed, preferably rigidly, to the catalytic system. In the embodiment whereby the device includes first and second parts, the rod is fixed to the second part.

The magnet is preferably fixed to the second part. It may be glued and/or screwed onto the second part.

The magnet may be made from an NdFeB alloy with formula $Nd_2Fe_{14}B$, SmCo, AlNiCo or a hard ferrite such as strontium ferrite.

The magnet is preferably fixed to the core. The magnet is preferably fixed to one longitudinal end of the core. It is for example glued and/or screwed to the core.

The core is preferably made of a ferromagnetic material. The core therefore increases the magnetic induction generated by the coil.

In a preferred variant, the core includes another magnet.

The other magnet may be fixed, in particular screwed and/or glued, to the core. The poles of the same polarity of the magnet and of the other magnet are preferably disposed facing one another. The other magnet is preferably fixed to the longitudinal end of the core opposite the longitudinal end to which the magnet is fixed. The rod is therefore sandwiched between the magnets. This increases the compactness of the device, this configuration enabling production of an electromagnetic field of higher intensity whilst reducing the number of windings of wire in the coil.

The device may include a spring for applying an elastic force to the catalytic system.

The spring may apply an elastic force to the catalytic system in the open position and/or in the closed position of the catalytic system.

The spring is preferably compressed by the catalytic system in the open position, and optionally in the closed position.

The spring may apply a closing elastic force to the catalytic system to maintain the catalytic system in the closed position in the absence of electrical current flowing in the coil, in particular in the absence of magnetic interaction between the magnet and the catalytic system.

The spring and the magnet may conjointly and respectively apply an elastic closing force and an electromagnetic closing force to the catalytic system in such a manner as to maintain the catalytic system in the closed position when the coil is electrically inactive. The spring therefore reinforces the retention of the catalytic chamber in the closed position as a result of the magnetic force.

By means of the spring, the device may be disposed in a plurality of open positions different from one another. The dimensions and/or shapes of the opening or openings accessible to the liquid for access to the catalysis chamber in the first and second open positions are preferably different. In this way the gas generation kinetic may be modified by moving the catalytic device between two different open positions. The movement of the rod between the closed position and one of the open positions results from the equilibrium of the forces that are applied to the rod, and in particular the electromagnetic force induced by the coil and the elastic force induced by the spring. By adapting the electrical current flowing in the coil the catalytic system may be disposed in different open positions. The spring may be disposed so as to apply the elastic closing force to the second part.

The spring may be housed between the coil and the catalytic system, preferably the second part.

The spring may be compressed in the open and closed positions.

The spring may be a coil spring or a leaf spring.

The rod may be housed in the spring.

Moreover, a gas generator is generally required to operate whatever the orientation in which it is disposed. Now, in the case of the generation of dihydrogen, the hydride aqueous solution generally includes sodium borohydride $NaBH_4$, the catalyzed reaction of which generates sodium metaborate $NaBO_2$, consuming water from the solution. The volume and the specific gravity of the hydride aqueous solution are therefore reduced and increased, respectively. To maintain a sufficient dihydrogen production yield, it may be necessary to add water in the enclosure during successive gas generation periods. For example, to ensure permanent immersion whatever the orientation of the device, the catalytic systems of WO 2012/003112 A1 and WO 2010/051557 A1 are therefore constrained to be fixed rigidly to the wall of the device and to be disposed substantially at the center of the enclosure.

The device according to the invention preferably includes a buoy conformed so that, if the device is put in contact with a liquid having a specific gravity higher than 0.6 and preferably lower than 6, the buoy flows on the liquid and the catalytic system is at least partly, preferably entirely, immersed in the liquid.

Accordingly, whatever the orientation of a gas generator including the device, the gas can be generated, the liquid being able to penetrate into the catalysis chamber in the open position of the catalytic system.

The electromagnetic system may be disposed between the buoy and the catalytic system.

The specific gravity of the flotation buoy is preferably less than the specific gravity of the catalytic system and/or of the electromagnetic system.

The buoy preferably has a specific gravity less than 0.6. It may be made of a polymer, for example expanded polystyrene.

The electromagnetic system may preferably be disposed between the buoy and the catalytic system to favor the immersion of the catalytic system in the liquid.

The buoy is preferably fixed to the casing. For example it is fixed over the lateral wall of the casing and/or fixed to the bottom wall of the casing.

Moreover, the device may include a battery electrically connected to the coil.

The battery is preferably housed in a sealed envelope. It is for example rechargeable by induction. The device can therefore advantageously be contained in a gas generator of complex shape.

The battery is for example fixed relative to the first part and/or relative to the coil. It may be fixed to the first part or disposed in the cage.

The coil may include n windings of copper wire and the battery may be adapted to generate a current I such that the product n·I is less than 1000 A.turns.

The device may include a receiver module configured to receive a control signal and to control the generation of an electrical current by the battery following reception of the control signal.

The control module may be configured to dispose the catalytic system in a plurality of open positions different from one another in the variant in which the device includes the spring.

The device may have a tubular general shape.

For example, in one embodiment, the device may have a length less than 50 mm and/or a height less than 30 mm and/or a depth less than 30 mm. The electromagnetic closing force induced by the magnet, to close the catalytic system, is for example greater than 2.0 N. The power of the electrical current applied to the coil is preferably between 1 W and 10 W inclusive, in particular less than 20 W.

The invention further concerns a gas generator, the generator including:
- an enclosure defining an interior space containing a liquid, and
- a device according to the invention at least partly immersed in the liquid so that in the open position the liquid penetrates into the catalysis chamber and the gas is generated by bringing the liquid into contact with the catalyst.

The liquid may be chosen from a solution, preferably an aqueous solution, of hydride and a liquid organic hydrogen carrier.

The hydride aqueous solution may include at least one hydride chosen from potassium borohydride, sodium borohydride, magnesium borohydride, calcium borohydride, lithium borohydride, lithium aluminum hydride, magnesium hydride, sodium aluminum hydride and mixtures thereof. It may further include an agent or a mixture of alkaline agents to limit spontaneous decomposition of the chemical hydride, in particular potassium hydroxide and/or sodium hydroxide.

An "organic liquid containing hydrogen" is also known as a liquid organic hydrogen carrier (LOHC). It is formed of a pair of compounds, a compound A rich in hydrogen and a compound B poor in hydrogen, denoted A/B. The LOHC may be chosen from toluene/methylcyclohexane, naphthalene/decalin, dibenzyltoluene (HO-DBT)/perhydro-dibenzyltoluene (H18-DBT), N-ethylcarbazole (HO-NEC)/dodecahydro-N-ethylcarbazole (H12-NEC), and mixtures thereof. The LOHC may be any compound enabling liquid/liquid cycling between a molecule rich in $H_2$ and a molecule poor in $H_2$.

The device may be partly immersed only in the liquid. The catalytic system is preferably totally immersed in the liquid, whatever the orientation of the generator may be.

The electromagnetic system may be immersed, for example entirely, in the liquid.

The device preferably includes a buoy as described, the buoy floating on the liquid and maintaining the catalytic system immersed, preferably completely, in the liquid.

In particular, the device is mobile relative to the enclosure. The device may be freely mobile relative to the enclosure. In particular, it may be free of electrical connection means or mechanical connection means with the enclosure.

The generator may include a battery electrically connected to the coil.

The gas generator may include electrical cables, in particular immersed in the liquid, connecting the battery to the coil.

The gas generator may include a control module configured to emit a control signal to trigger the supply of the coil with electrical current by the battery.

The invention also concerns a method generating a gas, including the successive steps of:
a) procuring a generator according to the invention;
b) supplying electrical power to the coil to open the catalysis chamber by moving the core relative to the coil so that liquid penetrates into the catalysis chamber and comes into contact with the catalyst.

The method is preferably executed to generate dihydrogen.

A magnitude to be regulated is preferably measured, the opening or the closing of the catalysis chamber being commanded when the magnitude to be regulated is below a minimum value or above a maximum value.

In particular, the magnitude to be regulated may be the pressure of the gas in the enclosure or the temperature of the gas or the temperature of the hydride solution or of the liquid organic hydrogen carrier.

According to a first embodiment, the magnitude to be regulated may be the pressure in the enclosure and the liquid may be a hydride solution.

According to a second embodiment, the magnitude to be regulated may be the temperature of the gas and the liquid may be a liquid organic hydrogen carrier. The closing of the catalytic system may then be commanded as soon as the temperature of the gas in the enclosure reaches a predetermined critical temperature.

The method may include a step c), after the step b), consisting in closing the catalytic system by cutting off the supply of electrical power to the coil.

BRIEF DESCRIPTION OF THE FIGURES

Other features, variants and advantages of the invention will emerge more clearly on reading the detailed description and the examples provided hereinafter by way of nonlimiting illustration and examining the appended drawings, in which:

FIG. 1 shows in longitudinal section one example of a gas generator according to the invention;

FIG. 2 is an enlarged view of the device contained in the gas generator shown in FIG. 1, in the closed position of the catalytic system;

FIG. 3 is an exploded 3D view of the device from FIG. 2;

FIG. 4 shows the device from FIG. 2 in an open position of the catalytic system, FIG. 5 shows a 3D view of the device from FIG. 2 in an open position of the catalytic system;

FIG. 6 shows the device from FIG. 5 in a closed position of the catalytic system;

FIG. 7 shows another example of the device seen in longitudinal section and in an open position of the catalytic system;

FIG. 8 shows the device from FIG. 7 in a closed position of the catalytic system;

FIG. 9 shows a further example of the device seen in longitudinal section and in an open position of the catalytic system;

FIG. 10 shows the device from FIG. 9 in a closed position of the catalytic system;

FIG. 11 shows another embodiment of a gas generator;

FIG. 12 shows the gas generator from FIG. 11 containing a smaller volume of liquid; and FIG. 13 shows the gas generator from FIG. 11 oriented differently relative to the direction of gravity.

In the figures, the scales and proportions of the various members and units constituting the apparatus and the device are not necessarily respected. Moreover, for clarity, members may be represented as not being in contact with one another although they are so in practice. Different references may designate the same member.

DETAILED DESCRIPTION

One example of a gas generator 5 according to the invention is shown in FIG. 1. The gas generator 1 includes an enclosure 10, a device 15, a battery 20, a measurement module 25 and a control module 30.

The enclosure defines an interior space 35 containing a liquid 40 adapted to react in contact with a catalyst to generate the gas. The liquid is for example a hydride aqueous solution or a liquid organic hydrogen carrier, which is able to generate dihydrogen by reacting with a catalyst.

The enclosure includes a vent 45 for evacuating the gas generated in the interior space, for example to a fuel cell, not shown.

The battery 20 is disposed outside the enclosure. Other arrangements of the battery may be envisaged, as will become apparent hereinafter. The battery is electrically connected to the device by means of conductive and flexible cables 50a-b immersed in the liquid.

The measurement module 25 is configured to measure a magnitude to be controlled. It is connected, for example electrically, to the control module to which is transmits the measured value of the magnitude to be controlled. For example the measurement module contains a sensor measuring the pressure of the gas in the enclosure.

The control module analyzes the value of the magnitude to be controlled and as a function of the result of the measurement is able to generate and to transmit a control signal $S_c$ to the battery to trigger or to cut off the electrical power supply of the device.

The device is immersed in the liquid.

In the example from FIG. 1, the device is fixed to the wall of the enclosure and is disposed substantially at the center of the enclosure. However, such an arrangement, simple to produce, is not limiting on the invention. As will be described hereinafter, other advantageous arrangement variants may be envisaged.

The device has a circular cylindrical and tubular general shape about a longitudinal axis X. It includes a catalytic system 60, an electromagnetic system 65 and a casing 70.

The casing has a hollow and tubular general shape. It includes a bottom wall 75 with a central hole 80 through it from which extends a lateral wall 85 in which windows 90 are produced.

The catalytic system includes a first part 100, a second part 95, a seal 105 and a catalyst 110.

In the configuration shown in FIGS. 1, 2 and 6 the catalytic system is disposed in a closed position. The first part blocks the upper opening 115 defined by the second part. The first part and the second part therefore define a closed catalysis chamber 120.

The catalyst 110, based for example on platinum and/or ruthenium, is housed in the catalysis chamber. It is of angular shape and is fixed to the first part. The first part has a wall 125 disposed facing the catalysis chamber, from which a projecting portion 130 extends in the longitudinal direction. The projecting portion has a lateral contour 135 of complementary shape to the shape of the catalyst. The catalyst is therefore fitted over and fixed to the first part, as shown in FIG. 1.

According to a variant that is not shown, the catalyst may be carried by the second part, for example rigidly fixed to the bottom of the second part. According to a further variant, the catalyst may take the form of two, for example annular, blocks respectively carried by the first part and by the second part.

The second part has a bottom 140 and a lateral wall 145 extending longitudinally from the bottom. The seal 105, made for example of an elastic material, is mounted on a longitudinal end face of the lateral wall of the second part.

In the closed position, the first and second parts sandwich and compress the seal. They therefore provide the seal against liquid and gas of the catalysis chamber. Accordingly, in the closed position of the catalytic system the liquid contained in the enclosure is not able to penetrate into the catalysis chamber. No gas is then generated.

Moreover, the first part 100 is mounted on, for example screwed to, the casing 70. The casing and the first part together define a cage 148 in which the electromagnetic system is housed.

The first and second parts are mobile in translation relative to one another in the longitudinal direction, as indicated by the arrows T. The movement of the second part relative to the first part is guided by the electromagnetic system to which the second part is connected.

The electromagnetic system 65 includes a coil 150 extending around the longitudinal axis and a rod 155.

The coil includes a winding support around which a copper wire is wound.

The coil includes an opening 160 through which the rod is mobile in translation along the longitudinal axis as shown by the arrows T.

In the example shown, the coil has a toric shape and completely surrounds the rod. A toric shape is not limiting on the invention, however. Alternatively, the coil may have a more generally annular shape.

The coil is housed in the cage between the lateral walls and the bottom of the casing and the catalytic system. The coil is fixed to the casing, for example clipped against the lateral wall or glued to the bottom wall. It is therefore fixed to the first part.

Moreover, the rod includes a core 170 and a magnet 175 fixed to one longitudinal end of the core. In the example from FIG. 1 the core is a circular cylinder but other shapes may be envisaged.

The core is preferably made of a ferromagnetic material and the magnet is fixed to the core. In a variant, the core may be made of an amagnetic or paramagnetic material.

In the closed configuration the magnet is disposed at its distance from the coil in the longitudinal direction. It is in particular fixed outside the central opening.

The rod 155 is fixed rigidly onto the second part 95.

In the example shown the second part is made of a plastic material.

The first part is made of a ferromagnetic material. It is therefore subjected to an electromagnetic force induced by the magnet that tends to attract it against the magnet.

In the absence of an electrical current flowing in the coil, the attraction between the first part and the magnet maintains the catalytic system in the closed position.

When an electrical current coming from the battery 20 passes through it, the coil 150 generates an electromagnetic field that attracts the magnet toward the coil. The intensity of the magnetic field is such that the absolute value of the force of attraction generated by the coil on the magnet is greater than the electromagnetic attraction force between the magnet and the catalytic system. The magnet is then moved in translation relative to the coil in the longitudinal direction toward the coil, as indicated by the arrows T, and draws with it the second part in a rigid body movement.

The coil being fixed relative to the first part, the result of this is that the second part is then distant from the first part. The catalytic system is then disposed in the open position, as can be seen in FIGS. 4 and 5. The liquid 40 contained in the enclosure then passes through the windows 90 of the casing and penetrates into the catalysis chamber via the opening 178 defined by the movement of the second part relative to the first part and is able to come into contact with the catalyst. Gas is then generated.

The pressure of gas in the enclosure then increases as the catalytic reaction proceeds and is measured by the measurement module. If the pressure of gas in the enclosure reaches a maximum pressure, the control module generates and transmits a control signal to cut off the supply of electrical current to the coil. The coil then no longer generates an electromagnetic field.

The magnetic force induced by the magnet, to which the first part is subjected, is then such that the first part is attracted by the magnet and is moved in the longitudinal direction until the catalytic system is disposed in the closed position.

The device shown in FIG. 1 is therefore particularly compact, and occupies a restricted volume in the interior space. The enclosure may advantageously contain a large volume of liquid.

The device 15 shown in FIGS. 7 and 8 differs from the device shown in FIGS. 1 to 6 in that the rod 155 includes another magnet 180.

The other magnet is mounted on the longitudinal end 185 of the core opposite that 190 to which the magnet is fixed.

The poles of the same polarity of the two magnets are disposed one facing the other in the longitudinal direction.

When the coil is supplied with electrical current both magnets are subjected to an electromagnetic force that drives them toward the open position of the catalytic system.

It is therefore possible to reduce the size of the coil by reducing the number of windings of metal wire, for example by at least a factor of 2 relative to the device from FIGS. 1 to 6, whilst producing a force to retain the catalytic system in the closed position that is substantially identical. The compactness of the device is therefore improved, as is the energy efficiency of the device. Such a device is particularly preferred.

The device 15 from FIGS. 9 and 10 differs from the device shown in FIGS. 1 to 6 in particular in that the device includes a spring 200, in that the core 170 is in contact via its longitudinal end 190 with and fixed to the second part 95, and in that the magnet 175 is fixed to the opposite end 185.

The spring 200 is sandwiched between the coil 150 and the second part 95, against which it bears.

In the example shown the spring is a Belleville washer including a central opening 205 in which the rod is engaged and is mobile. Alternatively, the spring may be a coil spring.

In the open and closed positions of the device the spring is compressed. The elastic energy stored in the spring is higher in the open position than in the closed position.

In the example shown, the first and second parts and the catalyst are made of amagnetic material, for example of a plastic material. No force of attraction is generated by the magnet in the catalytic system in the closed position or in the open position.

When the battery delivers an electrical current to the coil, the magnet is attracted toward the coil by the electrical current as it generates. The coil is configured so that the electromagnetic force generated by the passage of the current in the coil has an absolute value greater than the elastic compression force in the spring in the closed position.

The second part is then moved toward the coil, thus opening the catalysis chamber. The movement of the second part is stopped when the force of attraction of the magnet compensates the elastic compression force of the spring.

When the supply of electrical current to the coil is cut off, the spring expands and brings about the movement of the second part against the first part to close the catalytic system. The catalytic system is then subjected to an elastic closing force generated by the spring in compression.

Such a device is advantageous. For example, it may be intended to come into contact with liquids that corrode ferromagnetic metals such as steel. For example, the constituent members of the device, apart from the coil, the magnet and the catalyst, may be made of a polymer, for example a thermoplastic.

Moreover, the device may include another magnet, as shown in FIGS. 7 and 8.

In another variant of the device shown in FIGS. 9 and 10 the first part is made of a ferromagnetic material. The magnet and the first part are then attracted toward one another by the effect of the magnetic force induced by the magnet.

According to a first example, in the closed position the spring may be in equilibrium, that is to say it does not store elastic energy. It does not apply an additional force to the catalytic system to keep the catalysis chamber in the closed position. According to a second example, the spring may be compressed and applies an additional force to the catalytic system.

FIGS. 11 to 13 show a gas generator 5 including a device as represented in FIG. 2. The device further comprises a buoy 210 mounted on the casing.

The device is electrically connected to a battery 20 by means of flexible electrical cables 50*a-b*.

The device is freely mobile in the interior space. The electrical cables do not impede the movement of the device relative to the enclosure.

The buoy floats on the liquid and it maintains the catalytic system 60 completely immersed in the liquid, whether the volume of liquid contained in the second part is high, as shown in FIG. 11, or low, as shown in FIG. 12. Similarly, as shown in FIG. 13, when the enclosure is disposed with a different orientation, for example at 90° relative to the direction G of gravity, the catalytic system is kept totally immersed in the liquid. The flow rate of gas generated is the optimum whatever the configuration shown in FIGS. 11 and 13.

Moreover, in the example shown, the electromagnetic system 65 is totally immersed in the liquid. In a variant that is not shown, it may be disposed outside the liquid.

Examples

Dimensions of the Coil

By way of illustration, to ensure operation of the device consuming little electricity, it is required that the energy consumption of the electromagnetic system be at maximum 20 W. It is moreover required in accordance with the example that the coil generate on the magnet a force greater than the force applied by the magnet to the first part in the closed position that is greater than 2 N.

The coil includes n windings of a copper wire.

The total length of the copper wire is $L=n \cdot l_t$ with $l_t$ the length of a winding. The section Sb of the winding is obtained from the section of the copper wire, the whipping rate f and the winding number $Sb=S \cdot n/f$.

The resistance R of the coil is expressed as $R=n^2 \cdot l_t \cdot \rho/(Sb \cdot f)$, $\rho$ being the electrical resistivity of copper equal to $1.7 \times 10^{-8}$ $\Omega \cdot cm$.

The power P is then expressed as $P=RI^2=(n \cdot I)^2 \cdot lt \cdot \rho/(Sb \cdot f)$.

The person skilled in the art knows that the intensity of the magnetic field produced by the coil is dependent on the product $n \cdot I$ of the number n of windings by the current I circulating in the coil.

Example 1

In a first example as shown in FIGS. 7 and 8, the device has a tubular general shape, a height equal to 50 mm and a diameter equal to 30 mm.

The magnet applies a closing force to the catalytic system of the order of 2.5 N. It consists of NdFeB and has a flat circular cylindrical pastille shape of 10 mm diameter and 2 mm height.

The first part is made of steel or of soft iron.

In the closed position, the projecting portion is 2 mm from the magnet, the distance being measured in the longitudinal direction.

The coil is made of iron or of soft steel and has a length equal to 13 mm and a diameter equal to 10 mm.

The coil includes a magnetic circuit formed of steel plate 1 mm thick. The magnetic circuit channels the magnetic flux produced by the coil.

The coil has a toric shape of inside and outside diameter equal to 12 mm and 30 mm respectively, which corresponds to a winding area of 90 mm² and a winding length of 65 mm. The rod of diameter equal to 10 mm is therefore at a distance from the coil when it is engaged in the coil.

Opening the catalytic system necessitates the coil to have a product $n \cdot I$ of the order of 500 A.turns. The person skilled in the art knows how to determine this product easily as a function of the electrical voltage U at the terminals of the coil that is expressed as U=lt·ρ/(Sb·f)·n²·I. They also know how to determine the diameter D of the wire from the relation D=(4·Sb·f/π·n)$^{0.5}$.

For example, at a voltage U equal to 5 V, the number n of turns is equal to 400, the current I flowing through the coil is 1.3 A, the diameter D of the wire of the coil is equal to 0.38 mm and the power P dissipated to open the catalysis chamber is 6 W.

The travel of the core is 4 mm. The movement between the extreme open position and the closed position takes approximately 10 ms.

Example 2

In a second example as shown in FIGS. 7 and 8, the device has a tubular general shape, a height equal to 50 mm and a diameter equal to 30 mm.

The magnet applies a closing force to the catalytic system of the order of 2.5 N. It consists of ferrite and has a circular cylindrical pastille shape of 20 mm diameter and 5 mm height. The core is made of iron or of soft steel and has a length equal to 7 mm and a diameter equal to 20 mm.

In the closed position, the projecting portion of the second part is 2 mm from the magnet, the distance being measured in the longitudinal direction.

The coil includes a magnetic circuit formed of steel plate 1 mm thick.

The coil has a toric shape of inside and outside diameter equal to 22 mm and 32 mm respectively and the height of the torus is 10 mm, which corresponds to a winding area of 50 mm² and a winding length of 85 mm.

Opening the catalyst system necessitates the coil to have a product n·I of the order of 200 A.turns.

For example, at a voltage U equal to 5 V, the number n of turns is equal to 430, the current I is 0.5 A, the diameter D of the wire of the coil is equal to 0.27 mm and the power P dissipated to open the catalysis chamber is 2.5 W.

The travel of the core is greater than 5 mm. The movement between the extreme open position and the closed position takes approximately 20 ms.

As has been clearly apparent throughout the present description, generation of gas, in particular of dihydrogen, by means of a generator including the device according to the invention can easily be adapted as a function of the application for which the generated gas is intended. Moreover, the device is particularly compact and its use consumes little energy.

Of course, the invention is not limited to the embodiments of the device and of the gas generator according to the invention and to the embodiments of the method described and shown.

The invention claimed is:

1. A device including a catalytic system and an electromagnetic system,
   the catalytic system defining a catalysis chamber and including a catalyst of a reaction to generate a gas from a liquid, the catalyst being housed in the catalysis chamber,
   the electromagnetic system including a coil and a rod mobile relative to the coil, the rod being fixed to the catalytic system and including a magnet and a core,
   the electromagnetic system being configured to move the rod relative to the coil when an electrical current is passed through the coil, so as to dispose the catalytic system in an open position in which the catalysis chamber is in fluidic communication with the outside, and
   the catalytic system being disposed in a closed position in which the catalysis chamber is hermetically closed in the absence of electrical current through the coil.

2. The device according to claim 1, at least a part of the catalytic system being subjected to an electromagnetic closing force induced by the magnet that holds the catalytic system in the closed position in the absence of electrical current through the coil.

3. The device according to claim 1, the catalytic system including a first part and a second part fixed rigidly to the rod, the first and second parts together defining the catalysis chamber and being mobile relative to one another between the open and closed positions.

4. The device according to claim 3, at least a part of the catalytic system being subjected to an electromagnetic closing force induced by the magnet that holds the catalytic system in the closed position in the absence of electrical current through the coil, said part of the catalytic system including at least the first part and/or the catalyst.

5. The device according to claim 3, the second part being compressed between the first part and the rod in the closed position.

6. The device according to claim 3, including a casing, the first part being rigidly fixed to the casing, the first part and the casing forming a cage in which the coil is trapped.

7. The device according to claim 1, the magnet being fixed to one longitudinal end of the core.

8. The device according to claim 7, the rod including another magnet fixed to the longitudinal end of the core opposite the longitudinal end to which the magnet is fixed, the poles of the same polarity of the magnet and of the other magnet being disposed facing one another.

9. The device according to claim 1, including a spring for applying an elastic force to the catalytic system.

10. The device according to claim 1, the spring being compressed by the catalytic system in the open position.

11. The device according to claim 9, the spring applying an elastic closing force to the catalytic system to hold the catalytic system in the closed position in the absence of the passage of the electrical current in the coil.

12. The device according to claim 11, the spring being housed between the coil and the catalytic system.

13. The device according to claim 1, including a buoy conformed so that when the device is brought into contact with a liquid having a specific gravity greater than 0.6 the buoy floats on the liquid and the catalytic system is at least partly immersed in the liquid.

14. A gas generator, the generator including:
   an enclosure defining an interior space containing a liquid, and
   the device according to claim 1 at least partly immersed in the liquid so that in the open position the liquid penetrates into the catalysis chamber and the gas is generated by bringing the liquid into contact with the catalyst.

15. The gas generator according to claim 14, the liquid being chosen from a solution of hydride and a liquid organic hydrogen carrier.

16. The gas generator according to claim 14, the device being freely mobile in the enclosure.

17. A method of generating dihydrogen including the following successive steps:
   a) procuring the generator according to claim 15; and
   b) supplying electrical power to the coil to open the catalysis chamber by moving the rod relative to the coil so that the liquid penetrates into the catalysis chamber and comes into contact with the catalyst.

18. The method according to claim 17, comprising closing the catalytic system by cutting off the supply of electrical power to the coil.

19. The device according to claim 1, the spring being compressed by the catalytic system in the closed position.

20. The device according to claim 1, including a buoy conformed so that when the device is brought into contact with a liquid having a specific gravity greater than 0.6 the buoy floats on the liquid and the catalytic system is entirely immersed in the liquid.

\* \* \* \* \*